United States Patent
Lee et al.

(10) Patent No.: US 11,508,051 B2
(45) Date of Patent: Nov. 22, 2022

(54) IMAGE AND DATA ANALYTICS MODEL COMPATIBILITY REGULATION METHODS

(71) Applicant: Leica Microsystems CMS GmbH, Wetzlar (DE)

(72) Inventors: Shih-Jong James Lee, Bellevue, WA (US); Hideki Sasaki, Bellevue, WA (US)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 392 days.

(21) Appl. No.: 16/894,708

(22) Filed: Jun. 5, 2020

(65) Prior Publication Data

US 2021/0383525 A1 Dec. 9, 2021

(51) Int. Cl.
*G06T 7/00* (2017.01)
*G06N 20/00* (2019.01)

(52) U.S. Cl.
CPC ........... *G06T 7/0002* (2013.01); *G06N 20/00* (2019.01); *G06T 2207/20081* (2013.01); *G06T 2207/20084* (2013.01)

(58) Field of Classification Search
CPC . G06T 2207/20081; G06T 2207/20084; G06T 2207/10016; G06T 7/0012; G06T 2207/30196; G06T 2207/10024; G06T 2207/20036; G06T 2207/20056; G06T 2207/20152; G06T 2207/30112; G06T 2207/30232; G06T 5/002; G06T 5/40; G06T 7/0004; G06T 7/12; G06T 7/136; G06T 7/143; G06T 7/248; G06T 7/74; G06T 2207/10152
USPC ...................................................... 382/100
See application file for complete search history.

(56) References Cited

U.S. PATENT DOCUMENTS

2017/0293725 A1* 10/2017 Liu ................ G06F 16/24522
2018/0330205 A1* 11/2018 Wu ..................... G06K 9/6292
2020/0302169 A1* 9/2020 Short ................... G06V 10/809

OTHER PUBLICATIONS

Branislav Hollaender: "Deep Domain Adaptation in Computer Vision by Branislav Hollaender Towards Data Science", Jul. 2, 2019, XP055841250, Retrieved from the Internet: URL:https://towardsdatascience.com/deep-domain-adaptation-in-computer-vision-8da398d3167f [retrieved on Sep. 15, 2021] p. 1-p. 2.
Li Yitong et al.: "Extracting Relationships by Multi-Domain Matching", (Dec. 8, 2018), XP055841239, Retrieved from the Internet: URL:https://proceedings.neurips.cc/paper/2018/file/2fd0fd3efa7c4cfb034317b21f3c2d93-Paper.pdf [retrieved on Sep. 15, 2021] p. 2-p. 8.

* cited by examiner

*Primary Examiner* — Ajibola A Akinyemi
(74) *Attorney, Agent, or Firm* — 2SPL Patent Attorneys PartG mbB; Yong Beom Hwang

(57) ABSTRACT

A computerized model compatibility regulation method for imaging applications first performs a target domain B application by computing means using at least one image X and target domain B image analytics to generate a target domain B application output for X. The method then applies a reference domain A application by computing means to generate reference domain A application output for X. The method further performs a compatibility assessment to generate at least one compatibility result for X. In addition, the method checks the compatibility result for X and if the check output is incompatible, the method performs online correction to generate a corrected application output for X.

27 Claims, 10 Drawing Sheets

IMAGE AND DATA ANALYTICS MODEL COMPATIBILITY REGULATION METHODS

STATEMENT AS TO RIGHTS TO INVENTIONS MADE UNDER FEDERALLY SPONSORED RESEARCH AND DEVELOPMENT

This work was supported in part by U.S. Government grant number 5R44NS097094-04, awarded by the NATIONAL INSTITUTE OF NEUROLOGICAL DISORDERS AND STROKE, 1R44MH121167-01, awarded by the NATIONAL INSTITUTE OF MENTAL HEALTH and 1U44GM136091-01, awarded by the NATIONAL INSTITUTE OF GENERAL MEDICAL SCIENCES. The U.S. Government may have certain rights in the invention.

BACKGROUND OF THE INVENTION

Field of the Invention

The present invention relates to machine learning and deep learning model applications. More particularly, the present invention relates to computerized methods of model compatibility regulation for the effective deployment of image and data analytics for imaging and data processing applications.

Description of the Related Art a. Description of Problem that Motivated Invention

Imaging and data processing applications cover a wide range of capabilities such as speech recognition, decision support, automation, transactions, image enhancement, restoration, boundary segmentation, object detection, feature measurements, pattern recognition and computer vision, etc. These fields are undergoing unprecedented growth due to the new generations of computing hardware, storage, Artificial Intelligence (AI) software and sensor technologies. Nowadays, image and data analytics that embed data flow and processing algorithms into solution pipelines for target applications can be found in broad industries such as manufacturing, electronics, automotive, aerospace, biomedical researches, pre-clinical and clinical diagnostics/treatments, drug discoveries/developments and pharmaceutics, media, communication, banking, etc.

Machine Learning (ML), particularly Deep Learning (DL) is a type of AI which has recently seen a rise in popular interest. This sudden boost has been fueled primarily by the invention of Convolutional Neural Networks (CNNs), a novel machine learning algorithmic architecture as well as the availability of powerful and relatively cheap computing units such as GPUs, TPUs. CNNs have been shown to be particularly well suited for imaging and data processing applications. Recently, a growing amount of studies have used CNNs to analyze image and data streams, laying the foundation for a fundamental change in how imaging and data processing applications are performed and how image and data are interpreted. The areas where AI has been applied include speech recognition, AI-powered predictions, fraud prevention, credit decisions, voice to text, image restoration, such as denoising and resolution enhancement, extraction of structures from label-free microscopy imaging, i.e. virtual staining and automated, accurate classification and segmentation of microscopy/biological/medical images, the tracking of time-lapse images, etc. Many of the new generation image and data analytics incorporate DL models for sophisticated applications. Therefore, their behavior is governed not just by rules specified in the analytics, but also by model behavior learned from data. To make matters more complex, data inputs could be unstable, perhaps changing over time.

Developing and deploying ML models is relatively fast and cheap but maintaining them over time in the field could be difficult and expensive. Production image and data analytics especially the ones incorporating ML models require constant monitoring to ensure the model application results are correct in the deployment. Effective monitoring is a prerequisite for ongoing system maintenance, updates, auditing and configuration changes to enable successful deployment and customer satisfaction. It is important to know if the image and data analytics and its models are behaving as expected in an on-going basis. It is also important to detect incompatibility between the input data and the training data of the image and data analytics. The compatibility monitoring should be designed to provide early warnings to the myriad of things that could go wrong with a production image and data analytics such as data skew, model staleness, etc. Furthermore, it is highly desirable that the incompatibility can be detected even for a single image (data point) and the incompatibility situation can be self-corrected online. That is, correct results are generated even during the incompatible situation.

b. How Did Prior Art Solve Problem?

Compatibility monitoring is straightforward when user feedback or truth labels are available. In those cases, the image and data analytics performance can be tracked and periodically reevaluated using standard metrics such as precision, recall, or AUC. But in many applications, labels are expensive to obtain (requiring human analysts' manual review) or cannot be obtained in a timely manner. In this case, it becomes difficult to effectively monitor the internal behavior of a learned model for correctness, but the input data should be more transparent. Consequently, analyzing and comparing data sets is the first line of defense for detecting problems where the world is changing in ways that can confuse an ML model.

Prior art methods monitor model inputs and outputs looking for anything that steps outside of established norms for the model. The purpose is to identify shifts in ML model behavior that conflicts with the expectations. Given a set of expected feature values for an input image or model outputs, prior art methods check that a) the input values fall within an allowed set (for categorical inputs) or range (for numerical inputs) and b) that the frequencies of each respective value within the set align with what were seen in the past. The checks are performed by comparing the distributions of the variables in the training data to what are seen in production for those variables.

The comparison can be performed automatically using basic statistics such as median, mean, standard deviation, max/min values. For example, testing whether mean values are within the standard error of the mean interval. Prior methods also performed ad-hoc manual testing through full-blown statistical tests to compare the distribution of the variables. Different tests are performed depending on the variable characteristics. If the variables are normally distributed, standard tests such as t-test or ANOVA are performed. If they are not, non-parametric tests like Kruskal Wallis or the Kolmogorov Smirnov are used.

Some prior art approaches borrow from signal processing techniques for time series decomposition, where the time series can be used to represent a sequence of model outputs on different types of input data, or the amount of deviation between consecutive model runs. The approach calculates cross-correlation among the identified anomalies to facilitate root cause analysis of the model behavior.

Performing QA for complex, real-world ML applications is challenging because ML models fail for diverse and reasons that are unknown before deployment. Thus, the prior art approaches that focus on criteria and variables derived from training and verification metrics can still fail on the large volumes of deployment data that are not part of the training and verification set. Furthermore, the prior art methods rely on summary statistics of variable distribution that cannot detect anomaly of a single input. The input/output variables used for comparison are determined in an ad hoc fashion. Furthermore, the variables are remotely related to intrinsic behaviors of image and data application models. Moreover, when an anomaly is detected, they are unable to correct the incompatibility immediately (online) for the affected inputs.

BRIEF SUMMARY OF THE INVENTION a. Objectives/Advantages of the Invention

The regulation methods of the current invention not only monitor data analytics model compatibility but also correct incompatibility online. This requires the detection sensitivity up to a single anomaly and a method to adapt the incompatible data to match the model. The primary objective of the invention is to provide an image and data analytics model compatibility regulation method that performs anomaly detection through self-referencing. The secondary objective of the invention is to provide an image and data analytics model compatibility regulation method that can detect a single anomaly. The third objective of the invention is to provide an image and data analytics model compatibility regulation method that can perform online correction. The fourth objective of the invention is to provide an image and data analytics model compatibility regulation method that performs anomaly detection based on pre-trained application optimized internal representation. The fifth objective of the invention is to provide an image and data analytics model compatibility regulation method that can detect data skew and model staleness trends.

b. How does this Invention Solve the Problem?

The current invention converts inputs from source domain to at least one reference domain and generate converted image and data analytics for each of the reference domains. The results of applying the image and data analytics to source inputs are expected to be the same or similar to the results of applying the domain converted image and data analytics to the domain converted inputs. The reference domain conversion and result comparison allow self-referencing without explicit labeling and truth creation of the output for a single input. Therefore, the comparison can be performed for a single input rather than population based. That is the anomaly (incompatibility) detection sensitivity is down to a single anomaly.

The domain conversion is performed through encoding the input dates from source domain to an application optimized internal representation and then decode from the internal representation to the desired reference domains through trained domain generators. The application optimized internal representation is generated by training rather than ad hoc variable definition. Also, the decoders and generators are trained. When anomaly is detected, a new domain converter can be trained specifically for the novel domain online for converting from the novel domain to the source domain. Afterwards, the input data can be converted to the source domain and the image and data analytics re-apply to the converted data for immediate correction online. Furthermore, population-based monitoring can also be performed for data skew and model staleness trend detection based on the statistics derived from comparing the outputs from source and reference domains.

DETAILED DESCRIPTION OF THE PREFERRED EMBODIMENTS

The concepts and the preferred embodiments of the present invention will be described in detail in the following in conjunction with the accompanying drawings.

1. Model Compatibility Regulation Method for Imaging Applications

Figure 1:
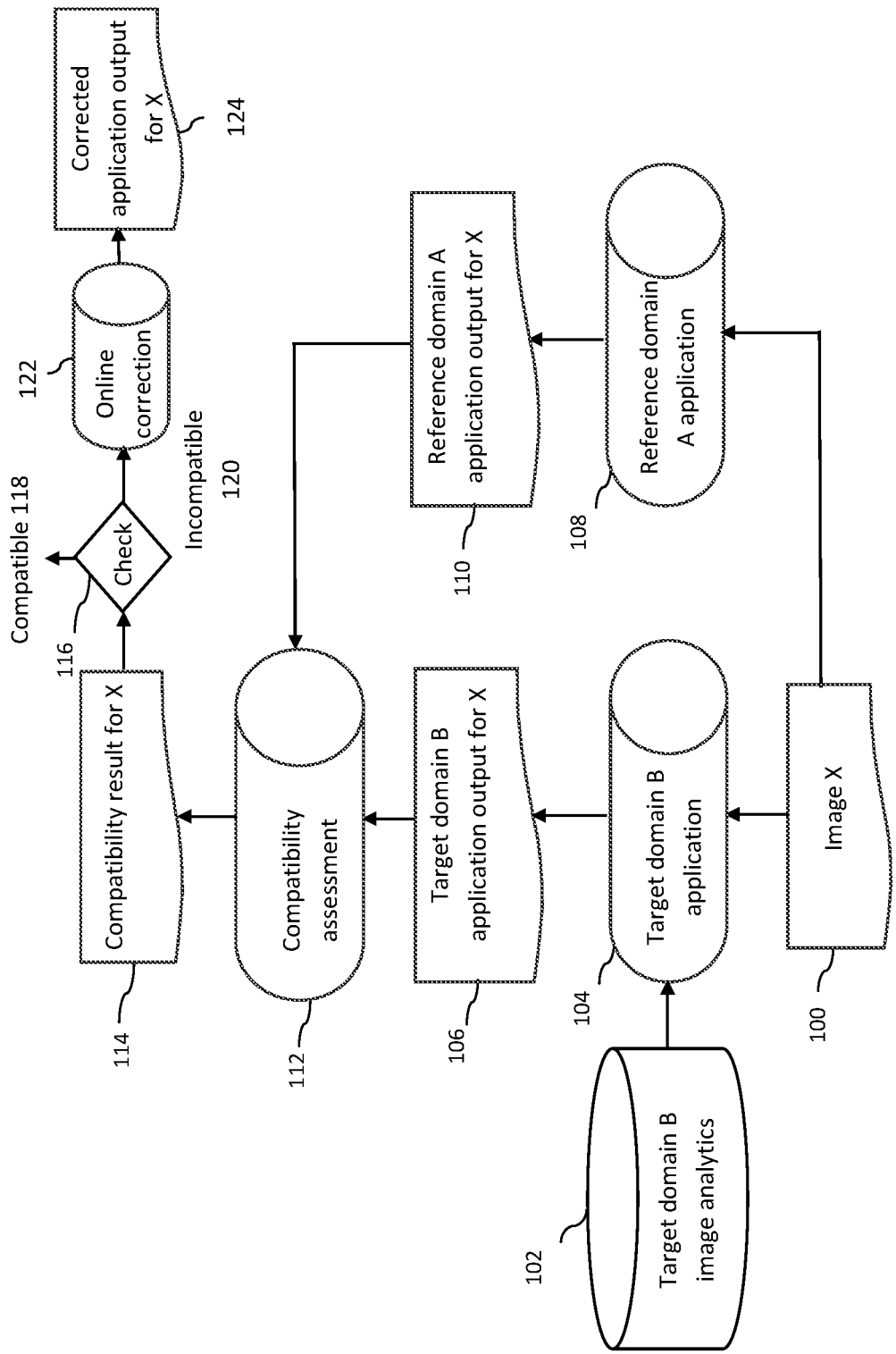
FIG. 1 shows the processing flow of the model compatibility regulation method for imaging applications according to the present invention.

FIG. 1 shows the processing flow of the model compatibility regulation method for imaging applications of the current invention. At least one image X 100 and a target domain (called "domain B") image analytics 102 are entered into electronic storage means such as computer memories. A target domain B application 104 is performed by computing means using the at least one image X 100 and the target domain B image analytics 102 to generate a target domain B application output for X 106. The computing means include central processing unit (CPU), graphics processing unit (GPU), digital signal processor (DSP) from local and/or cloud platforms and/or mobile devices. They can be carried out by electronics, quantum computing or optical computing devices.

A reference domain (called "domain A") application 108 is performed by computing means using the at least one image X 100 to generate reference domain A application output for X 110. A compatibility assessment 112 is performed by computing means using the target domain B application output for X 106 and the reference domain A application output for X 110 to generate at least one compatibility result for X 114. Furthermore, a check 116 may also be performed using the at least one compatibility result for X 114 to determine a compatible 118 or incompatible 120 output. If the check output is incompatible 120, an online correction 122 is performed to generate corrected application output for X 124. The individual components and/or steps are further explained in the following.

1.1 Input Image X and Target Domain

The input image X can be single image or a batch of images that are received and are applied by the image analytics during deployment. The target domain B is the image domain that the image analytics is designed to perform. The model compatibility regulation of the current invention is to assure that the input image X is compatible with the target domain B so that the image analytics can yield acceptable results.

1.2 Image Analytics

The current invention is applicable to a broad range of image analytics such as image processing pipelines for image enhancement/restoration, boundary segmentation, object detection, feature measurements, pattern recognition and computer vision, etc. For example, microscopy image analysis software Aivia offers image analytics (recipes) for 3D electron microscopy analysis, 3D neuron analysis, 3D object analysis, 3D object tracking, calcium oscillation, cell count, cell proliferation, cell tracking, colony analysis, exocytosis detection, filament tracking, neurite outgrowth, nuclei count, nuclei tracking, particle tracking, phase cell tracking, pixel colocalization and wound healing, etc.

Moreover, some image analytics include machine learning processing modules such as random forests, support vector machines or DL models containing multiple layers of artificial neural networks such as Convolutional deep Neural Networks (CNNs), Recurrent Neural Networks (RNNs), Generative Adversarial Networks (GANs) and their variants such as Unet, UNet with residual blocks (ResUNet), deep Residual Channel Attention Networks (RCAN), UNet with densely-connected blocks (DenseUNet), Conditional Adversarial Networks (CAN), Bidirectional LSTM, Ensemble DNN/CNN/RNN, Hierarchical Convolutional Deep Maxout Network, etc.

Those skilled in the art should recognize that other image processing pipelines and machine learning/DL models could be covered by the current invention. For example, a class of DL based image analytics uses a region-based deep learning model for instance segmentation called Mask R-CNN to detect the bounding boxes and also to generate a pixel-wise segmentation of defects. The Mask R-CNN is the latest in a series of deep-region, proposal-based models for object detection (e.g., R-CNN, Fast R-CNN, Faster R-CNN) that consists of two stages. In the first stage, called the region proposal network, a base CNN extracts a feature map from the input image and predicts a set of class-agnostic box proposals that might contain objects of interest.

1.3 Reference Domain Application

A reference domain (domain A) is an image domain that is distinctively different from the target domain (domain B) but the image analytic can be modified to operate within such domain. It could represent the largest variation (beyond any training data variation) allowed for the image applications.

Figure 2:
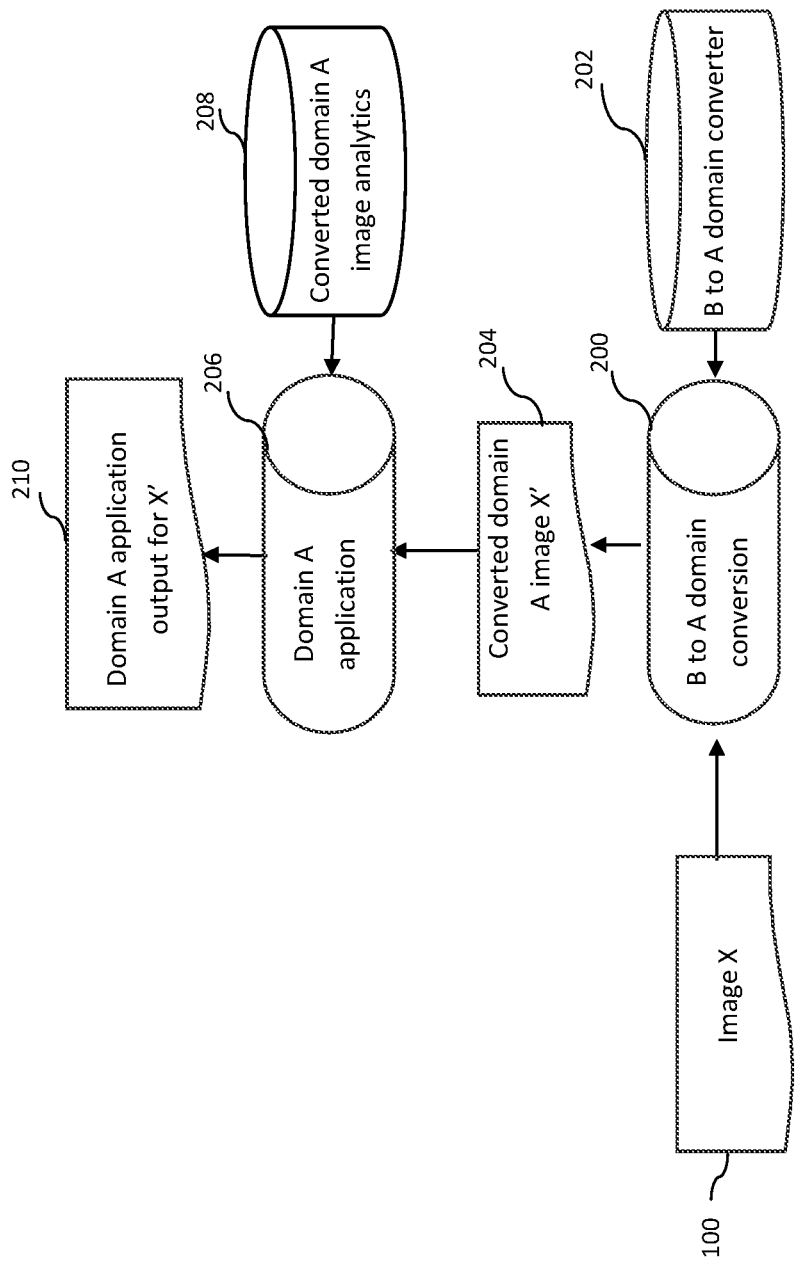
FIG. 2 shows the processing flow of the domain conversion referencing method for imaging applications according to the present invention.

In one embodiment of the invention, the reference domain A application 108 is performed by the domain conversion referencing method. As shown in FIG. 2, the domain conversion referencing method comprises a B to A domain conversion step 200 and a domain A application step 206. The B to A domain conversion step 200 uses a B to A domain converter 202 to generate converted domain A image X' 204 and the domain A application step 206 uses a converted domain A image analytics 208 to generate domain A application output for X' 210 which is the reference domain A application output for X 110.

Figure 3:
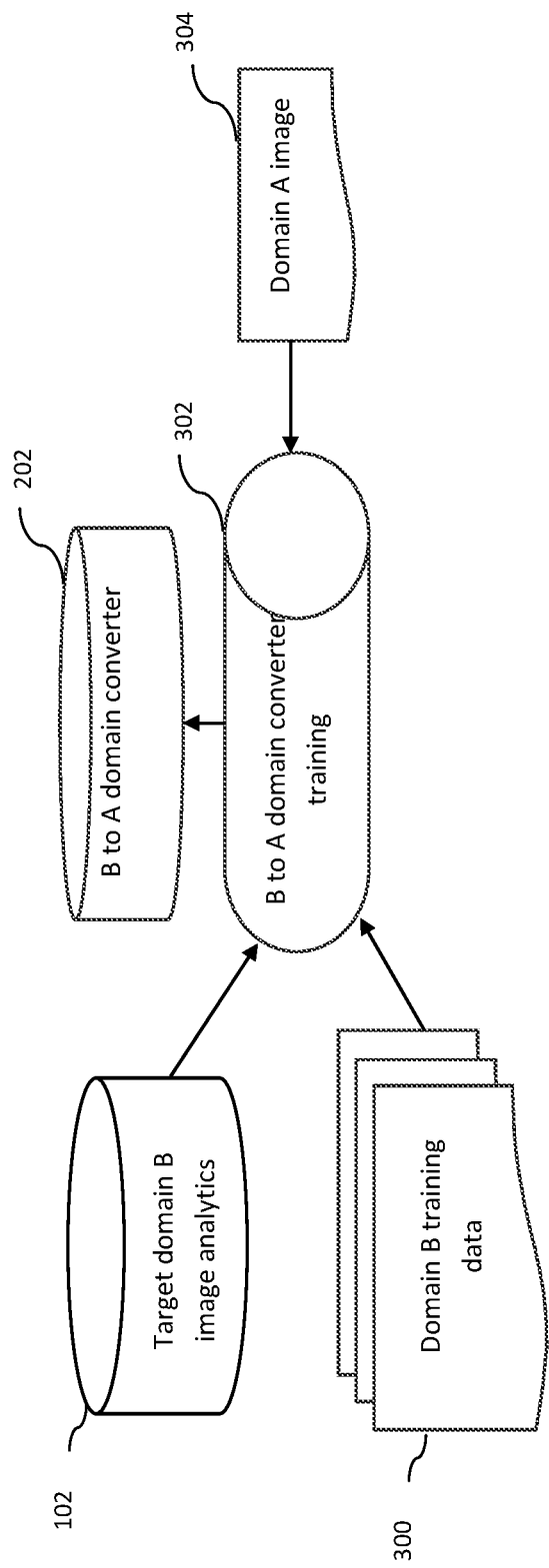
FIG. 3 shows the processing flow of the B to A domain converter training method for imaging applications according to the present invention.

As shown in FIG. 3, the B to A domain converter 202 is generated by performing B to A domain converter training 302 using the target domain B image analytics 102, a plurality of domain B training data 300 and at least one domain A image 304. In one embodiment of the invention, the B to A domain converter 202 contains encoders $E_A$, $E_B$ and generators $G_A$, $G_B$. The details of the training procedure are described in section 3 of the specification that are applicable to both images and other data formats.

Note that representative domain B images from the training data for the creation of the target domain B image analytics are contained in the domain B training data 300. Only images are needed for the B to A domain converter training 302. Annotation data used for training the imaging analytics are not needed in this case. A single representative domain A image 304 will be sufficient for the domain converter training 302. Although more domain A images could yield more stable converters.

Figure 4:
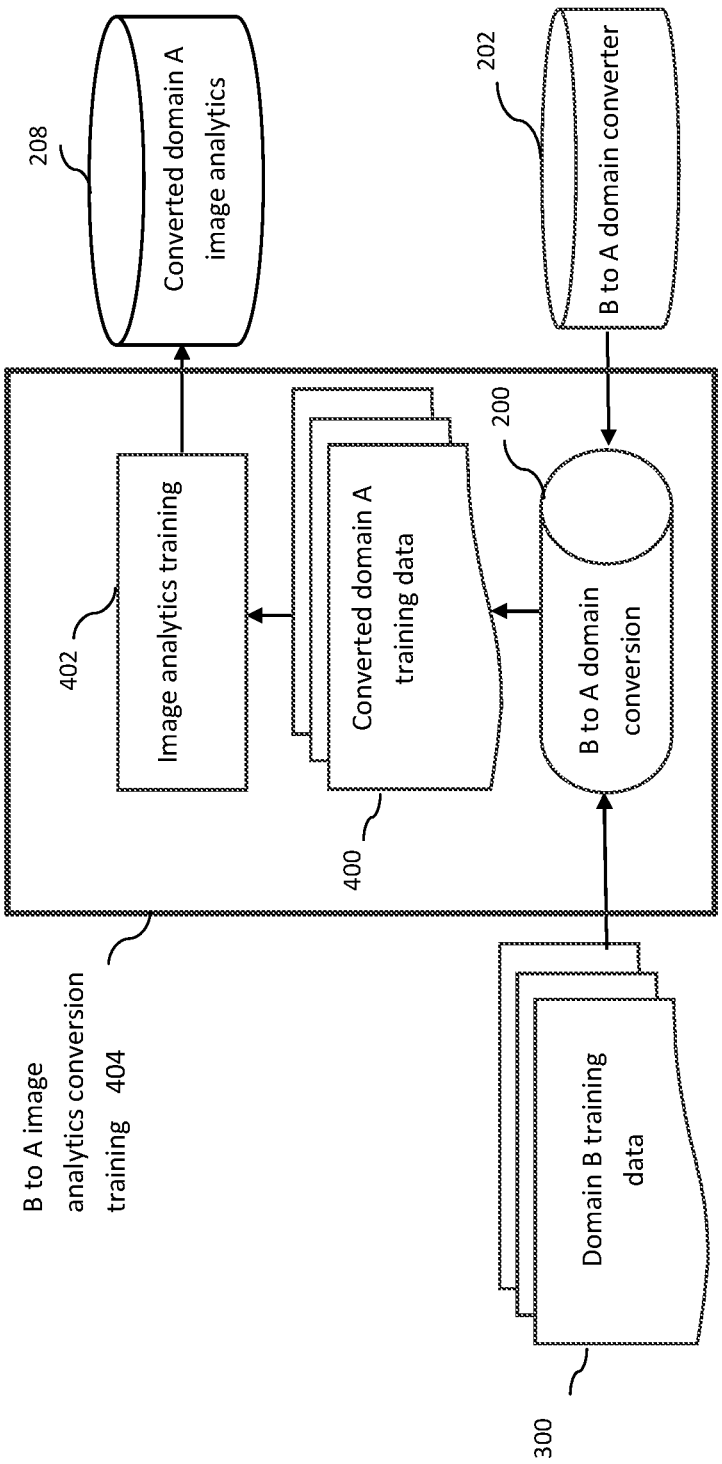
FIG. 4 shows the processing flow of the B to A image analytics conversion training method for imaging applications according to the present invention.

The converted domain A image analytics 208 is generated by performing B to A image analytics conversion training 404 using a plurality of domain B training data 300 and the B to A domain converter 202. As shown in FIG. 4, a B to A domain conversion 200 is performed using a plurality of domain B training data 300 and the B to A domain converter 202 to generate converted domain A training data 400. The converted domain A training data 400 is then used by image analytic training 402 to generate the converted domain A image analytics 208.

1.4 Compatibility Assessment and Check

The compatibility assessment step 112 compares the target domain B application output for X 106 and the reference domain A application output for X 110 to generate compatibility result for X 114. When the input image X 100 is compatible with the image analytics, the target domain B application and the reference domain A application should have the same or similar outputs 106 and 110. Therefore, even though the truth label for the target domain B application output for X 106 is unknown, the compatibility assessment can be performed by checking the difference between target domain B application output for X 106 and the reference domain A application output for X 110. The compatibility result for X comprises at least one difference metric.

If the application output is an image, the error metrics such as normalized root-mean-square error (NRMSE) and the structural similarity index (SSIM), a measurement of the perceived similarity between two images, can be used. An alternative embodiment of the compatibility assessment could extend the image analytics to output a probability distribution to model uncertainty of the outputs, then evaluate the model compatibility by the disagreement between the distributions of target domain B application output and reference domain A application output. The Kullback- Leibler divergence can be commonly used to measure the difference between two probability distributions, but other methods such as the Jensen-Shannon divergence could be used as well.

If the outputs are image regions of different types or classification categories, accuracy metrics such as F1 score can be used. Those ordinary skilled in the art should recognize that many prior art image difference metrics can be used and are within the scope of the current invention.

The compatibility result for X is checked 116 against acceptance criteria that can be determined from the training data or dynamically defined. If the compatibility result for X is within the acceptable range based on the criteria, it is determined as compatible 118. Otherwise, it is determined as incompatible 120.

When image X 100 contains a plurality of samples, population-based monitoring can also be performed for data skew and model staleness trend detection based on the statistics derived from comparing the outputs from source and the reference domain. The population-based monitoring can be performed by tests using basic statistics such as median, mean, standard deviation, max/min values. For example, testing whether mean values are within the standard error of the mean interval. Full-blown statistical tests can be used to compare the distribution of the difference metrics. Different tests are performed depending on the difference metrics characteristics. If the metrics are normally distributed, standard tests such as t-test or ANOVA are performed. If they are not, non-parametric tests like Kruskal Wallis or the Kolmogorov Smirnov are used.

1.5 Online Correction

When compatibility check result is incompatible 120, the computerized model compatibility regulation method of the current invention will attempt to perform online correction. The online correction step trains and applies a new domain converter. A new domain converter is trained using the target domain B image analytics 102, a plurality of domain B training data 300 and image X 100. The converter is trained to convert from the incompatible domain of image X to target domain B.

In one embodiment of the invention, the encoders $E_A$, $E_B$ and generators $G_A$, $G_B$ based converter is trained. As detailed in section 3 of the specification, such converter can be trained with a single input of image X domain and the converter is bi-directional. That is, it can simultaneously train a converter from domain A to domain B and from domain B to domain A.

After the converter is generated, the converter is applied to image X to convert the image to be compatible with target domain B. Therefore, the target domain B image analytics 102 can be applied to the converted image X to yield compatible results. In another embodiment of the invention, the incompatible domain of image X can be retained as an additional reference domain to extend the model compatibility regulation method online.

Figure 5:
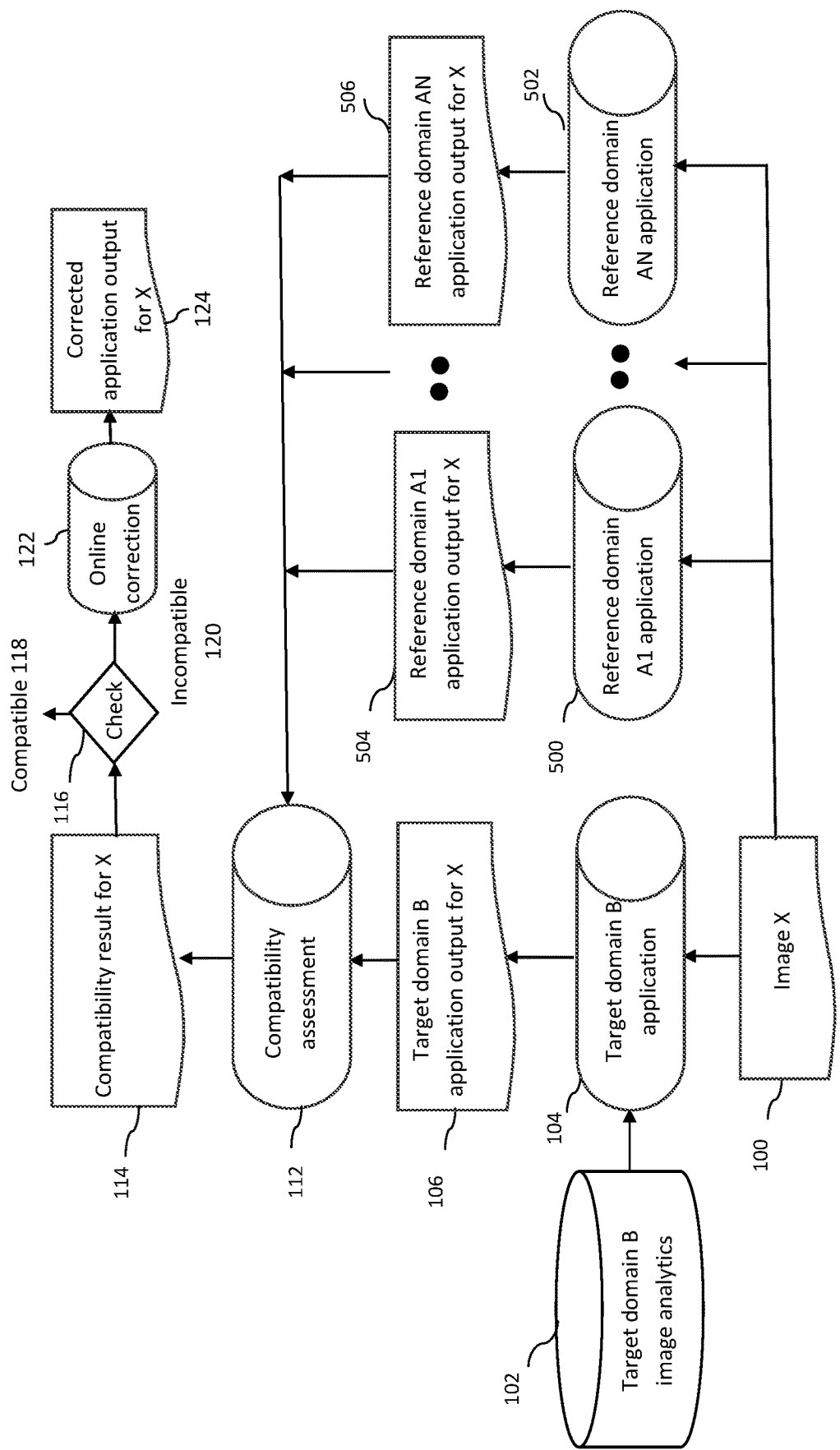
FIG. 5 shows the processing flow of a multi-reference model compatibility regulation method for imaging applications according to the present invention.

2. Multi-Reference Model Compatibility Regulation Method for Imaging Applications FIG. 5 shows the processing flow of the multi-reference model compatibility regulation method for imaging applications of the current invention. At least one image X 100 and a target domain B image analytics 102 are entered into electronic storage means such as computer memories. A target domain B application 104 is performed by computing means using the at least one image X 100 and the target domain B image analytics 102 to generate a target domain B application output for X 106. The computing means include central processing unit (CPU), graphics processing unit (GPU), digital signal processor (DSP) from local and/or cloud platforms and/or mobile devices. They can be carried out by electronics, quantum computing or optical computing devices.

A plurality of reference domain (called "domain Ai") applications 500-502 are performed by computing means using the at least one image X 100 to generate reference domain Ai application outputs for X 504-506. A compatibility assessment is performed by computing means using the target domain B application output for X 106 and the reference domain Ai application outputs for X 504-506 to generate at least one compatibility result for X 114. Furthermore, a check 116 can be performed using the compatibility result for X 114 to determine a compatible 118 or incompatible 120 output. If the check output is incompatible 120, an online correction 122 is performed to generate corrected application output for X 124. Furthermore, just like described section 1.5, online correction can be performed by training and applying a new domain converter.

The unique components and/or steps are further explained in the following.

2.1 A Plurality of Reference Domain Applications

The multi-reference model compatibility regulation method allows a plurality of reference domains, each of them (domain Ai) can represent an image domain that is distinctively different from the target domain (domain B). The multi-reference approach enables a robust reference scheme to capture a variety of variations that the image analytics could encounter during the deployment and the image analytic can be modified to operate within those domains.

In one embodiment of the invention, the plurality of reference domain Ai applications 500-502 are performed by a plurality of domain conversion referencing methods. Each of the domain conversion referencing methods comprises a B to Ai domain conversion step and a domain Ai application step. The B to Ai domain conversion step uses a B to Ai domain converter to generate converted domain A image Xi and the domain Ai application step uses a converted domain Ai image analytics to generate domain Ai application output for Xi which is the reference domain Ai application output for X.

The B to Ai domain converter is generated by performing B to Ai domain converter training using the target domain B image analytics, a plurality of domain B training data and at least one domain Ai image. In one embodiment of the invention, the B to Ai domain converter contains encoders $E_{Ai}$, $E_B$ and generators $G_{Ai}$, $G_B$. The details of the training procedure are described in section 3 of the specification. The converted domain Ai image analytics is generated by performing B to Ai image analytics conversion training. In the training, a B to Ai domain conversion is performed using a plurality of domain B training data and the B to Ai domain converter to generate converted domain Ai training data. The converted domain Ai training data is then used by image analytic training to generate the converted domain Ai image analytics.

2.2 Compatibility Assessment and Check

The compatibility assessment step 112 compares the target domain B application output for X 106 and the plurality of reference domain Ai application outputs for X, 504-506 to generate compatibility result for X 114. When the input image X 100 is compatible with the image analytics, the target domain B application 104 and the reference domain Ai applications 500-502 should have the same or similar outputs 106 and 504-506. Therefore, even though the truth label for the target domain B application output for X 106 is unknown, the compatibility assessment can be performed by checking the differences between target domain B application output for X 106 and the reference domain Ai application outputs for X 504-506. The compatibility result for X comprises at least one difference metric derived from the comparison.

Similar to the single reference case (see section 1.4), the pair-wise error metrics such as normalized root-mean-square error (NRMSE) and the structural similarity index (SSIM), Kullback-Leibler divergence, Jensen-Shannon divergence, F1 scores, etc. can be measured between target domain B application output for X 106 and each of the reference domain Ai application outputs for X 504-506. We call target to reference metrics as inter-error metrics. Furthermore, the error metrics are measured among the pairs of the reference domain Ai application outputs for X 504-506. We call them intra-error metrics.

The compatibility result for X is checked 116 against acceptance criteria that can be determined from the training data or dynamically defined. In one embodiment of the invention, the intra-error metrics are used to dynamically define the acceptance criteria for maximum, minimum, medium and mean values of the inter-error metrics. If the compatibility result for X is within the acceptable range based on the criteria, it is determined as compatible 118. Otherwise, it is determined as incompatible 120.

When image X 100 contains a plurality of samples, population-based monitoring can also be performed for data skew and model staleness trend detection based on the statistics derived from comparing the outputs from source and the reference domain. The population-based monitoring can be performed by tests using basic statistics such as median, mean, standard deviation, max/min values. For example, testing whether mean values are within the standard error of the mean interval. Full-blown statistical tests can be used to compare the distribution of the difference metrics. Different tests are performed depending on the difference metrics characteristics. If the metrics are normally distributed, standard tests such as t-test or ANOVA are performed. If they are not, non-parametric tests like Kruskal Wallis or the Kolmogorov Smirnov are used.

3. Model Compatibility Regulation Method for Data Processing Applications

Figure 6:
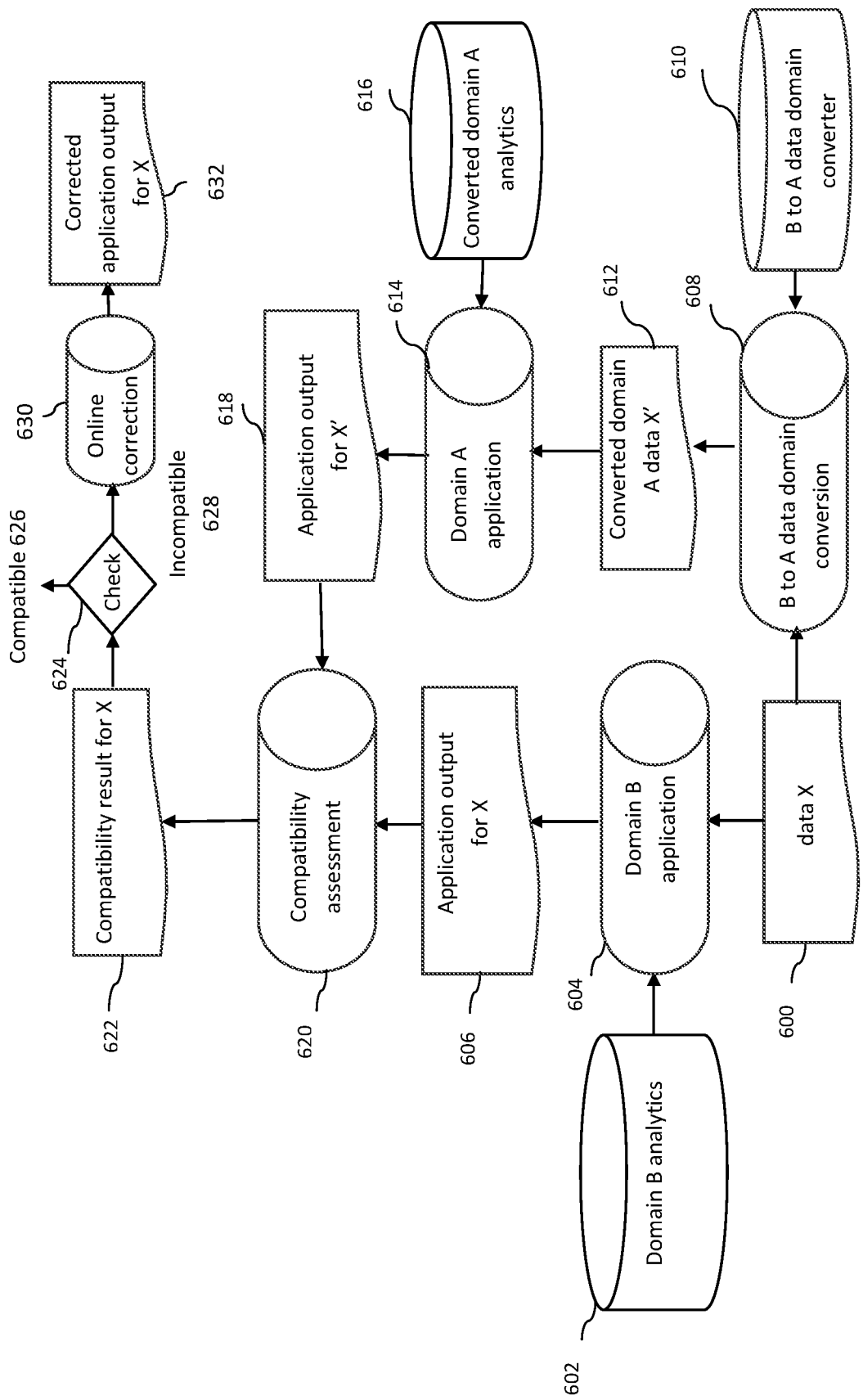
FIG. 6 shows the processing flow of the model compatibility regulation method for data processing applications according to the present invention.
Figure 7:
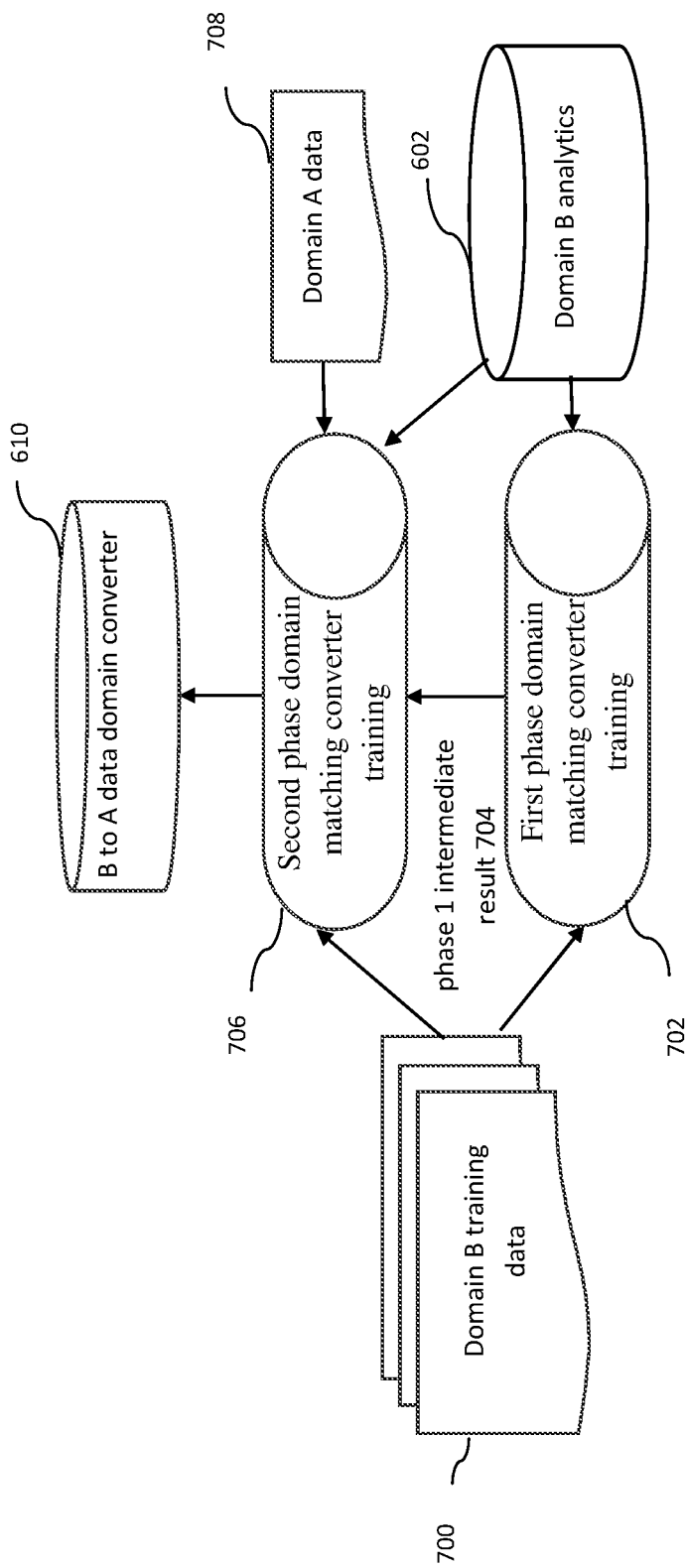
FIG. 7 shows the processing flow of the B to A data domain matching converter training method for data processing applications according to the present invention.

The model compatibility regulation method is not limited to imaging applications. It can be applied to general data processing applications and the domain conversion can be performed on non-imaging data as well as images. FIG. 6 shows the processing flow of the model compatibility regulation method for data processing applications of the current invention. At least one data X 600, a target domain (called "domain B") analytics 602, a B to A data domain converter 610 and a converted domain A analytics 616 are entered into electronic storage means such as computer memories. A domain B application 604 is performed by computing means using the at least one data X 600 and the domain B analytics 602 to generate an application output for X 606. The computing means include central processing unit (CPU), graphics processing unit (GPU), digital signal processor (DSP) from local and/or cloud platforms and/or mobile devices. They can be carried out by electronics, quantum computing or optical computing devices.

A B to A data domain conversion 608 is performed by computing means using the at least one data X 600 and the B to A data domain converter 610 to generate a converted domain A data X' 612. A domain A application 614 is performed by computing means using the converted domain A data X' 612 and the converted domain A analytics 616 to generate an application output for X' 618. A compatibility assessment 620 is performed by computing means using the application output for X 606 and the application output for X' 618 to generate at least one compatibility result for X 622.

Furthermore, a check 624 can be performed using the compatibility result for X 622 to determine a compatible 626 or incompatible 628 output. If the check output is incompatible 628, an online correction 630 is performed to generate corrected application output for X 532. The individual components and/or steps are further explained in the following.

3.1 Data Domain Matching Converter Training Method

The domain matching converter can map in both directions (A to B and B to A) between the domain A, in which there may only be a single data and a domain B, for which there is a richer training set. In one embodiment of the invention, the B to A data domain converter 610 consists of encoders $E_A$, $E_B$ and generators $G_A$, $G_B$. In addition, there are two discriminators $Dr_1$, $Dr_2$ that are created during phase 1 and phase 2 trainings for application enhancements that optimize the conversion for the analytics. To apply the B to A data domain converter 610, we first apply $E_B$ to domain B data and then applying $G_A$ to generate converted domain A data.

To enrich the training sample, the data are augmented for data in domains B and A to create P(S), s∈B and P(x), x∈A. The training includes two phases. In phase 1, the autoencoder for domain B is application enhanced pre-trained using augmented data of P(S). In phase 2, the application enhanced autoencoder for each of the two domains $E_A$, $G_A$, $E_B$, $G_B$ are jointly trained using augmented images P(S) and P(x). The autoencoder for domain B is further trained and a separate autoencoder for domain A, initialized as a clone of the phase 1 pretrained autoencoder of B.

The B to A data domain converter 610 is generated by B to A data domain matching converter training. A plurality of domain B training data 700 and domain A data 708 are entered into electronic storage means. A first phase domain matching converter training 702 is performed using domain B training data 700 and domain B analytics 602 to generate phase 1 encoder $E_B$ and phase 1 generator $G_B$ stored in phase 1 intermediate result 704. A second phase domain matching converter training 706 is performed using domain B training data 700, domain A data 708, domain B analytics 602 and the phase 1 intermediate result 704 to simultaneously train and generate the B to A data domain converter 610 containing encoders $E_A$, $E_B$ and generators $G_A$, $G_B$.

Domain B Training Data

Domain B training data 700 should include raw data and truth annotations. The training data sample size should be large enough to train application analytics. In a speech processing application of the embodiment, the data may include speech signals that are temporal sequences or frequency spectrum of the signals. In a microscopy image application of the embodiment, the data may include not only images and truth annotations but also metadata such as microscope types, objective lens, excitation light source, intensity, excitation and dichroic filters, emission filters (for florescence microscopy), detector gain and offset, pinhole size, sampling speed/exposure time, pixel dimensions (size, time point, focus position), etc. In addition, the specimen types and conditions such as live, fixed, organelle types, etc. can also be stored as metadata.

First Phase Domain Matching Converter Training

Figure 8:
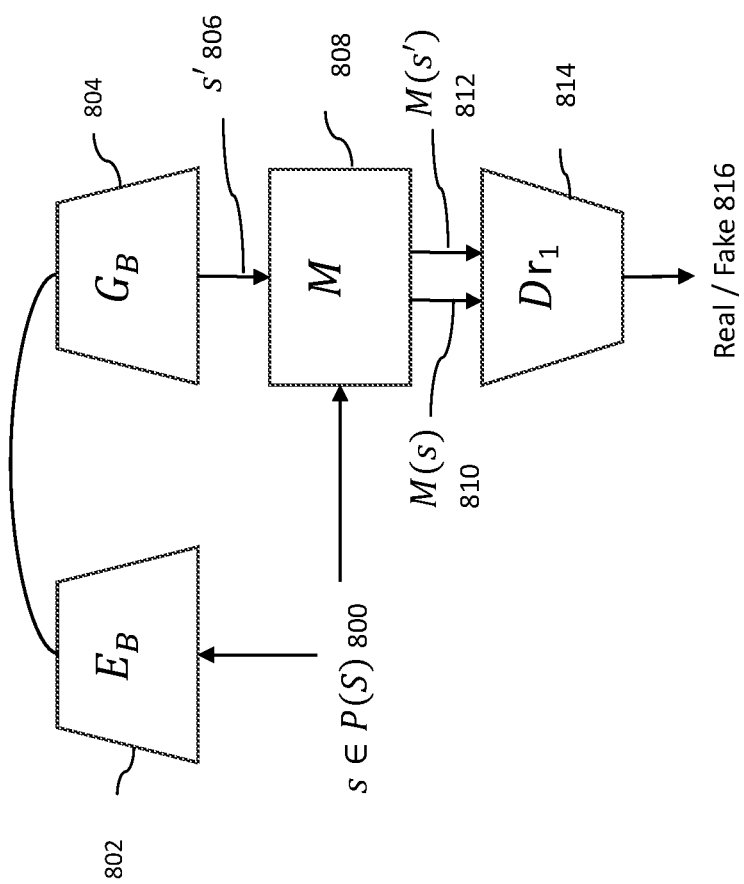
FIG. 8 shows the processing flow of the first phase domain matching converter training according to the present invention.

The first phase (phase 1) domain matching converter training generates $E_B$ and $G_B$ with the basic requirement that ∀s∈B, s≅$G_B(E_B(s))$. FIG. 8 shows the processing flow of one embodiment of the first phase domain matching converter training. The augmented domain B training data s∈P(S) 800 where S⊂B are encoded by the encoder $E_B$ 802 and generated by the generator $G_B$ 804 to create auto-converted s, called s' 806. The data processing application analytics is designated as a functional model M 808. Both s 800 and s' 806 are applied to M 808 to generate data processing application analytics outputs M(s) 810 and M(s') 812. The discriminator $Dr_1$ 814 is trained to discriminate between the application outputs from real data M(s) 810 and fake data M(s') 812. The real/fake 816 truth is known and provided for discriminator $Dr_1$ 814 training. The phase 1 training is performed by alternately minimizing $\mathcal{L}^{B+}$ and $\mathcal{L}_{D_1}$.

In one embodiment of the invention, the loss function $\mathcal{L}^{B+}$ is the weighted combination of the reconstruction loss $\mathcal{L}_{REC_B}$, the variational loss $\mathcal{L}_{VAE_B}$ and an adversarial loss $\mathcal{L}_{GAN_B}$. That is, $$\mathcal{L}^{B+} = \mathcal{L}_{REC_B} + \lambda_1 \mathcal{L}_{VAE_B} + \lambda_2 \mathcal{L}_{GAN_B}$$

Where $\lambda_1$ and $\lambda_2$ are the weight parameters, and $$\mathcal{L}_{REC_B} = \sum_{s \in P(S)} \|G_B(E_B(s)) - s\|_1$$

$$\mathcal{L}_{VAE_B} = \sum_{s \in P(S)} KL(\{E_B(s) | s \in P(S)\} \| \mathcal{N}(0, I))$$

$$\mathcal{L}_{GAN_B} = \sum_{s \in P(S)} \ell(\overline{Dr_1}(\overline{M}(G_B(E_B(s)))), 1)$$

The discriminator loss function is $$\mathcal{L}_{D1} = \sum_{s \in P(S)} [\ell(Dr_1(\overline{M}(\overline{G_B}(\overline{E_B}(s)))), 0) + \ell(Dr_1(\overline{M}(s)), 1)]$$

The loss functions $\ell$ above can be selected from state-of-art functions such as binary cross entropy, least squares loss, Wasserstein loss and relativistic loss, etc.

The bars in above terms indicate that parameters of the networks under the bars are fixed during backpropagation. CNNs can be configured and trained for encoders and generators. In one embodiment of the invention, PatchGAN is used for the discriminator $Dr_1$. Those skilled in the art should recognize that different state-of-the-art CNN architectures (e.g., VGG, ResNet, GoogLeNet, MobileNet, etc.) can be used depending on the memory, speed, and performance requirements. The training process is general purpose that is applicable to data, signal and images.

Second Phase Domain Matching Converter Training

Figure 9:
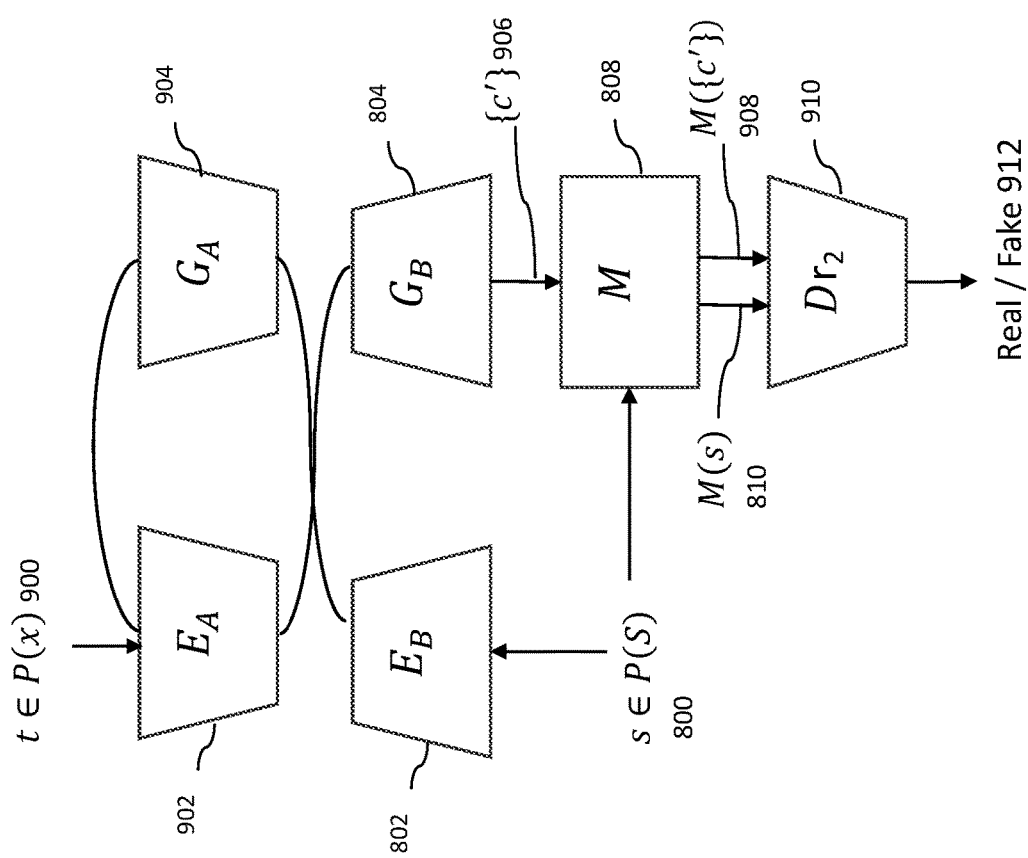
FIG. 9 shows the processing flow of the second phase domain matching converter training according to the present invention.

The second phase (phase 2) trains the autoencoder of domain A jointly with the pretrained autoencoder of domain B. $E_A$ and $G_A$ are initialized with phase 1 created $E_B$ and $G_B$. FIG. 9 shows the processing flow of one embodiment of the phase 2 domain matching converter training. The augmented domain B training images s∈P(S) 800 where S⊂B are encoded by the encoder $E_B$ 802 and generated by the generator $G_B$ to create auto-converted s, called s'. The augmented domain A training images t∈P(x) 900 where x∈A are encoded by the encoder $E_A$ 902 and generated by the generator $G_A$ to create auto-converted t, called t'. The s' and t' are collectively called converted images {c'} 906. Both s 800 and {c'} 906 are applied to M 808 to generate data processing application analytics outputs M(s) 810 and M({c'}) 908. The discriminator $Dr_2$ 910 is trained to discriminate between the application outputs from real data M(s) 810 and fake data M({c'}) 908. The real/fake 912 truth is known and is provided for discriminator $Dr_2$ 910 training. In one embodiment of the invention, $Dr_1$ 814 and $Dr_2$ 910 have the same network architecture and in the beginning of phase 2, $Dr_2$ is initialized to the phase 1 trained $Dr_1$ parameter values. In another embodiment of the invention, a single discriminator Dr is used for $Dr_1$ 814 and $Dr_2$ 910. That is, a single Dr is initially trained in phase 1 and continued trained in phase 2.

The phase 2 training is performed by alternately minimizing $\mathcal{L}^{AB+}$ and $\mathcal{L}_{D2}$.

In one embodiment of the invention, the loss function $\mathcal{L}^{AB+}$ is the weighted combination of different loss components $$\mathcal{L}^{AB+} = \mathcal{L}_{REC_B} + \lambda_3 \mathcal{L}_{REC_A} + \lambda_4 \mathcal{L}_{VAE_B} + \lambda_5 \mathcal{L}_{VAE_A} + \lambda_6 \mathcal{L}_{GAN_B} + \lambda_7 \mathcal{L}_{GAN_A} + \lambda_8 \mathcal{L}_{bab\text{-}cycle} + \lambda_9 \mathcal{L}_{aba\text{-}cycle} + \lambda_{10} \mathcal{L}_{f\text{-}cycle}$$

Where $\lambda_i$ are the weight parameters, $\mathcal{L}_{REC_B}$ and $\mathcal{L}_{REC_A}$ are reconstruction losses and $\mathcal{L}_{VAE_B}$ and $\mathcal{L}_{VAE_A}$ are variational losses.

$$\mathcal{L}_{REC_B} = \sum_{s \in P(S)} \|G_B(E_B(s)) - s\|_1, \quad \mathcal{L}_{REC_A} = \sum_{t \in P(x)} \|G_A(E_A(t)) - t\|_1$$

$$\mathcal{L}_{VAE_B} = \sum_{s \in P(S)} KL(\{E_B(s) | s \in P(S)\} \| \mathcal{N}(0, I)),$$

$$\mathcal{L}_{VAE_A} = \sum_{t \in P(x)} KL(\{E_A(t) | t \in P(x)\} \| \mathcal{N}(0, I))$$

The $\mathcal{L}_{GAN_B}$ and $\mathcal{L}_{GAN_A}$ are adversarial losses $$\mathcal{L}_{GAN_B} = \sum_{s \in P(S)} \ell(\overline{Dr_2}(\overline{M}(G_B(E_B(s)))), 1),$$

$$\mathcal{L}_{GAN_A} = \sum_{t \in P(x)} \ell(\overline{Dr_2}(\overline{M}(G_B(E_A(t)))), 1)$$

$\mathcal{L}_{bab\text{-}cycle}$ and $\mathcal{L}_{aba\text{-}cycle}$ are cycle-consistency losses from domain B to domain A and back, and from A to B and back. $\mathcal{L}_{f\text{-}cycle}$ is the feature cycle from the encoded version of samples s∈B to samples in A and back to the latent space.

$$\mathcal{L}_{bab\text{-}cycle} = \sum_{s \in P(S)} \|G_B(\overline{E_A}(\overline{G_A}(E_B(s)))) - s\|_1$$

$$\mathcal{L}_{aba\text{-}cycle} = \sum_{t \in P(x)} \|G_A(\overline{E_B}(\overline{G_B}(E_A(t)))) - t\|_1$$

$$\mathcal{L}_{f\text{-}cycle} = \sum_{s \in P(S)} \|E_A(G_A(\overline{E_B}(s))) - \overline{E_B}(s)\|_1$$

The discriminator loss function is $$\mathcal{L}_{D2} = \sum_{s \in P(S)} [\ell(Dr_2(\overline{M}(\overline{G_B}(\overline{E_B}(s)))), 0) + \ell(Dr_2(\overline{M}(s)), 1)] +$$

-continued $$\sum_{t \in P(x)} \ell(Dr_2(\overline{M}(\overline{G_B}(\overline{E_A}(t)))), 0)$$

Just like before, the bars in the above terms are used to indicate that these networks are not updated during the backpropagation ("detached") of this loss. Note that no feature loss coming from x∈A is applied. This way the encoder and generator of domain A is trained to adapt to domain B's latent space, and not vice versa. Moreover, during training, we "freeze" the weights of $E_B$ and backprop only through $G_A$ and $E_A$. The selective backpropagation ensures that the encoder and generator of domain A are adapted to the latent space of domain B, and not vice versa. This prevents overfitting by the single or just a few images from the domain A. Just like phase 1, the phase 2 training process is general purpose that is applicable to data, signal and images.

Note that the training is bi-directional. That is, both B to A converter and A to B converter are trained simultaneously. After the training, encoders $E_A$, $E_B$ and generators $G_A$, $G_B$ are created. To apply the B to A data domain converter, we first apply $E_B$ to domain B data and then applying $G_A$ to generate domain A converted data. Similarly, to apply the A to B data domain converter, we first apply $E_A$ to domain A data and then applying $G_B$ to generate domain B converted data.

3.2 Data Analytics Conversion Training Method

The converted domain A training data 1000 can be used to create the application analytics that is domain A compatible. Therefore, a well-established domain B training data 700 can be re-used to create data processing analytics for domain A. In one embodiment of the invention, the training data is divided into training and validation set for the training of DL model-based data application analytics. The training set is used to train the deep models and the validation set is used to evaluate the deep model training status and readiness. The domain B training annotation data can usually be directly used along with B to A converted data for the Converted domain A training data 1000. In some cases, if the annotation data is domain dependent, the B to A data domain converter 610 can also be trained for the annotation data conversion.

Figure 10:
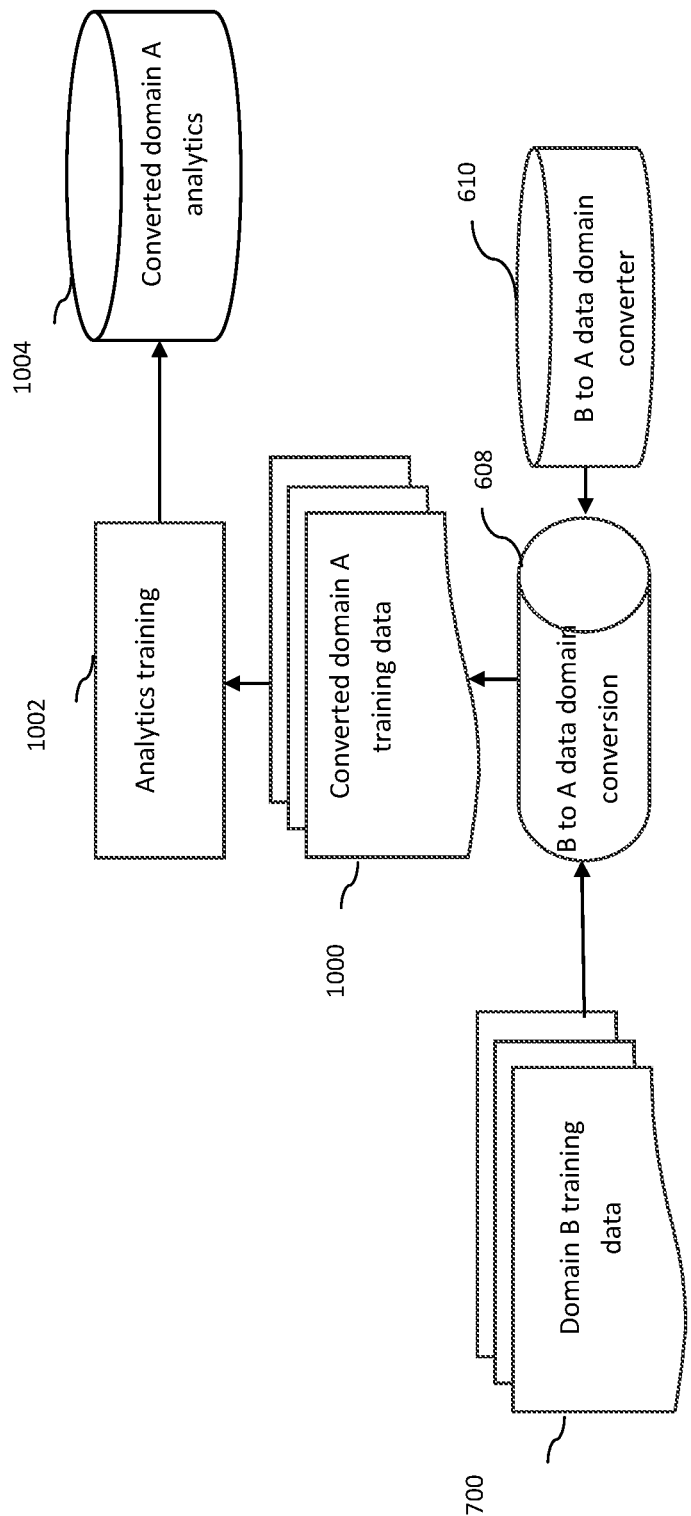
FIG. 10 shows the processing flow of the B to A data analytics conversion training method for data processing applications according to the present invention.

FIG. 10 shows the processing flow of the data analytics conversion training method. A plurality of domain B training data 700 is entered into electronic storage means. A B to A data domain conversion 608 is performed by computing means using the plurality of domain B training data 700 and the B to A data domain converter 610 to generate converted domain A training data 1000. An analytics training 1002 is performed using the converted domain A training data 1000 to generate converted domain A analytics 1004 output.

3.3 Compatibility Assessment and Check

The compatibility assessment step 620 compares the application output for X 606 and the application output for X' 618 to generate compatibility result for X 622. The compatibility result for X comprises at least one difference metric. For image data, error metrics such as NRMSE, SSIM, Kullback-Leibler divergence, Jensen-Shannon divergence and F1 score as described in section 1.4 can be used. For temporal sequence data, similarity measurements between two temporal sequences such as dynamic time warping (DTW) can be used. DTW is a method that calculates an optimal match between two given sequences (e.g. time series) with certain restriction and rules. Those ordinary skilled in the art should recognize that many prior art data difference metrics can be used and are within the scope of the current invention.

In addition, an additional compatibility score can be derived by applying the application outputs to the discriminator $Dr_2$ 910. Since $Dr_2$ 910 is trained to discriminate between the application outputs from real data and fake data. The real/fake output of $Dr_2$ can be used as an additional compatibility score. When the score is high, the data X 600 is predicted to be real which is compatible and vice versa. The additional compatibility score can be combined with the at least one difference metric to generate the compatibility result for X 622.

The compatibility result for X 622 is checked 624 against acceptance criteria that can be determined from the training data or dynamically defined. If the compatibility result for X is within the acceptable range based on the criteria, it is determined as compatible 626. Otherwise, it is determined as incompatible 628.

When data X contains a plurality of samples, population-based monitoring can also be performed for data skew and model staleness trend detection based on the statistics derived from comparing the outputs from source and the converted domain. The population-based monitoring can be performed by tests using basic statistics such as median, mean, standard deviation, max/min values. For example, testing whether mean values are within the standard error of the mean interval. Full-blown statistical tests can be used to compare the distribution of the difference metrics. Different tests are performed depending on the difference metrics characteristics. If the metrics are normally distributed, standard tests such as t-test or ANOVA are performed. If they are not, non-parametric tests like Kruskal Wallis or the Kolmogorov Smirnov are used.

3.4 Online Correction

Similar to section 1.5, when compatibility check result is incompatible 628, the computerized model compatibility regulation method for data processing of the current invention will attempt to perform online correction. The online correction step trains and applies a new domain converter. A new domain converter is trained using the target domain B analytics 602, a plurality of domain B training data 700 and data X 600. The converter is trained to convert from the incompatible domain of data X to target domain B.

In one embodiment of the invention, the encoders $E_A$, $E_B$ and generators $G_A$, $G_B$ based converter is trained. As detailed in section 3.1 of the specification previously, such converter can be trained with a single input of data in X domain.

After the converter is generated, the converter is applied to data X 600 to convert the data to be compatible with target domain B. Therefore, the target domain B analytics 602 can be applied to the converted data X to yield compatible results. In another embodiment of the invention, the incompatible domain data X can be retained as an additional reference domain to extend the model compatibility regulation method online.

The invention has been described herein in considerable detail in order to comply with the Patent Statutes and Rules and to provide those skilled in the art with the information needed to apply the novel principles and to construct and use such specialized components as are required. However, it is to be understood that the invention can be carried out by specifically different equipment and devices, and that various modifications, both as to the equipment details, deep models and imaging and data analytics and operating procedures, can be accomplished without departing from the scope of the invention.

What is claimed is:

1. A computerized model compatibility regulation method for imaging applications, the method comprising the steps of:
   a) inputting at least one image X and a target domain B image analytics into electronic storage means;
   b) performing a target domain B application by computing means using the at least one image X and the target domain B image analytics to generate a target domain B application output for X;
   c) performing a reference domain A application by computing means using the at least one image X to generate a reference domain A application output for X; and
   d) performing a compatibility assessment by computing means using the target domain B application output for X and the reference domain A application output for X to generate at least one compatibility result for X.

2. The computerized model compatibility regulation method of claim 1, wherein the reference domain A application is performed by a domain conversion referencing method.

3. The computerized model compatibility regulation method of claim 2, wherein the domain conversion referencing method comprises a B to A domain conversion step and a domain A application step.

4. The computerized model compatibility regulation method of claim 3, wherein the B to A domain conversion step uses a B to A domain converter to generate converted domain A image X' and the domain A application step uses a converted domain A image analytics and the converted domain A image X' to generate a domain A application output for X' which is the reference domain A application output for X.

5. The computerized model compatibility regulation method of claim 4, wherein the B to A domain converter is generated by performing a B to A domain converter training using the target domain B image analytics, a plurality of domain B training data and at least one domain A image.

6. The computerized model compatibility regulation method of claim 4, wherein the converted domain A image analytics is generated by performing a B to A image analytics conversion training using a plurality of domain B training data and the B to A domain converter.

7. The computerized model compatibility regulation method of claim 1, wherein the compatibility result for X comprises at least one difference metric.

8. The computerized model compatibility regulation method of claim 1, further comprising the steps of:
   e) performing a check using the at least one compatibility result for X to generate an output, that is compatible or incompatible; and
   f) if the check output is incompatible, performing online correction to generate a corrected application output for X.

9. The computerized model compatibility regulation method of claim 8, wherein the online correction step trains and applies a new domain converter to convert the at least one image X to match a target domain B.

10. A computerized multi-reference model compatibility regulation method for imaging applications, the method comprising the steps of:
    a) inputting at least one image X and a target domain B analytics into electronic storage means;
    b) performing a target domain B application by computing means using the at least one image X and the target domain B image analytics to generate a target domain B application output for X;
    c) performing a plurality of reference domain Ai applications by computing means using the at least one image X to generate a plurality of reference domain Ai application outputs for X; and
    d) performing a compatibility assessment by computing means using the target domain B application output for X and the plurality of reference domain Ai application outputs for X to generate at least one compatibility result for X.

11. The computerized multi-reference model compatibility regulation method of claim 10, wherein the plurality of reference domain Ai applications are performed by a plurality of domain conversion referencing methods.

12. The computerized multi-reference model compatibility regulation method of claim 11, wherein each of the domain conversion referencing methods comprises a B to Ai domain conversion step and a domain Ai application step.

13. The computerized multi-reference model compatibility regulation method of claim 12, wherein the B to Ai domain conversion step uses a B to Ai domain converter to generate converted domain A image Xi and the domain Ai application step uses a converted domain Ai image analytics and the converted domain A image Xi to generate a domain Ai application output for Xi which is the reference domain Ai application output for X.

14. The computerized multi-reference model compatibility regulation method of claim 13, wherein the B to Ai domain converter is generated by performing a B to Ai domain converter training using the target domain B image analytics, a plurality of domain B training data and at least one domain Ai image.

15. The computerized multi-reference model compatibility regulation method of claim 13, wherein the converted domain Ai image analytics is generated by performing a B to Ai image analytics conversion training using a plurality of domain B training data and the B to Ai domain converter.

16. The computerized multi-reference model compatibility regulation method of claim 10, wherein the compatibility result for X comprises at least one difference metric.

17. The computerized multi-reference model compatibility regulation method of claim 10, further comprising the steps of:
    e) performing a check using the at least one compatibility result for X to generate an output that is compatible or incompatible; and
    f) if the check output is incompatible, performing online correction to generate a corrected application output for X.

18. The computerized multi-reference model compatibility regulation method of claim 17, wherein the online correction step trains and applies a new domain converter to convert the at least one image X to match a target domain B.

19. A computerized model compatibility regulation method for data processing applications, the method comprising the steps of:
    a) inputting at least one data X, a domain B analytics, a B to A data domain converter and a converted domain A analytics into electronic storage means;
    b) performing a domain B application by computing means using the at least one data X and the domain B analytics to generate an application output for X;
    c) performing B to A data domain conversion by computing means using the at least one data X and the B to A data domain converter to generate a converted domain A data X';

d) performing a domain A application by computing means using the converted domain A data X' and the converted domain A analytics to generate an application output for X'; and e) performing a compatibility assessment by computing means using the application output for X and the application output for X' to generate at least one compatibility result for X.

20. The computerized model compatibility regulation method for data processing applications of claim 19, wherein the B to A data domain converter is generated by a B to A data domain matching converter training.

21. The computerized model compatibility regulation method for data processing applications of claim 20, wherein the B to A data domain matching converter training comprises the steps of:

inputting a plurality of domain B training data and domain A data into electronic storage means, performing a first phase domain matching converter training using the plurality of domain B training data and the domain B analytics to generate a phase 1 intermediate result composed of a phase 1 encoder $E_B$ and a phase 1 generator $G_B$; and performing a second phase domain matching converter training using the plurality of domain B training data, the domain A data, the domain B analytics and the phase 1 intermediate result to simultaneously train and generate the B to A data domain converter containing encoders $E_A$, $E_B$ and generators $G_A$, $G_B$.

22. The computerized model compatibility regulation method for data processing applications of claim 21, wherein the step of performing B to A data domain conversion first applies $E_B$ to the at least one data X and then applies $G_A$ to generate the converted domain A data X'.

23. The computerized model compatibility monitoring method for data processing applications of claim 19, wherein the converted domain A analytics is generated by a B to A data analytics conversion training.

24. The computerized model compatibility regulation method for data processing applications of claim 23, wherein the B to A data analytics conversion training comprises the steps of:

inputting a plurality of domain B training data into electronic storage means;

performing a B to A data domain conversion by computing means using the plurality of domain B training data and the B to A data domain converter to generate converted domain A training data; and performing an analytics training using the converted domain A training data to generate converted domain A analytics.

25. The computerized model compatibility regulation method for data processing applications of claim 19, wherein the compatibility result for X comprises at least one difference metric.

26. The computerized model compatibility regulation method for data processing applications of claim 19, further comprising the steps of:

f) performing a check using the compatibility result for X to generate an output that is compatible or incompatible; and g) if the check output is incompatible, performing online correction to generate a corrected application output for X.

27. The computerized model compatibility regulation method for data processing applications of claim 26, wherein the online correction step trains and applies a new domain converter to convert the at least one data X to match a target domain B.

* * * * *